Jan. 9, 1962 E. R. COOPER 3,016,127
BELT CONVEYOR APPARATUS
Filed Oct. 19, 1956 2 Sheets-Sheet 1

INVENTOR.
EMMIT R. COOPER
BY
*J.R. Harris*
ATTORNEY

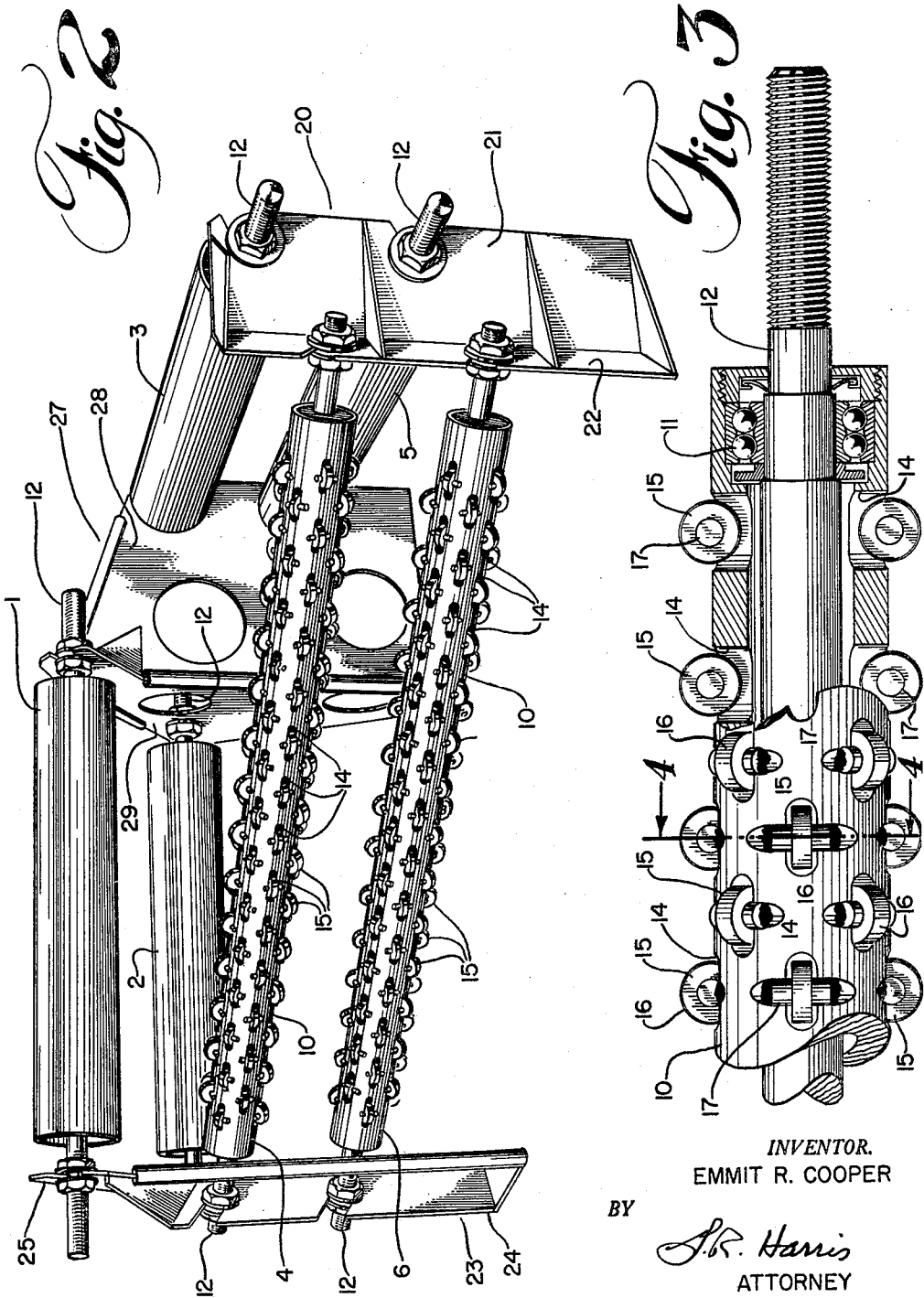

United States Patent Office 3,016,127
Patented Jan. 9, 1962

3,016,127
BELT CONVEYOR APPARATUS
Emmit R. Cooper, California, Pa., assignor to Jones & Laughlin Steel Corporation, Pittsburgh, Pa., a corporation of Pennsylvania
Filed Oct. 19, 1956, Ser. No. 617,012
11 Claims. (Cl. 198—184)

This invention is concerned with endless belt conveyors. More specifically, it relates to an endless belt conveyor adapted to convey material along one straight path and from the end of that path along another straight path which is not an extension of the first path. My apparatus is particularly suitable for use in underground mines, such as coal mines.

The underground mining of coal is now very largely carried out by automatic machinery which cuts the coal at the face and loads it onto a conveyor whereby it is transported out of the mine. Since the automatic mining machines move forward as they cut and load coal from a face, it is necessary that the conveyor onto which the coal is loaded follow the machine as it moves forward, and for this purpose it is common to use a belt conveyor having a storage or slack loop of belt which can be fed out as the conveyor end adjoining the mining machine moves forward along with the mining machine. In coal mines it is common practice to open up a passageway or gallery running more or less parallel to the coal face and from this gallery to drive one or more passages more or less perpendicular to the coal face. Thus, the coal mined must be transported along a relatively short passageway away from the face and then transported in a direction which may be at right angles to that of its previous travel. This can be done, of course, with two belt conveyors, that from the face being positioned so that it discharges upon a second conveyor travelling in another direction. However, in the relatively confined passageway leading up to the face there is usually little room in which to store slack in the first conveyor belt so that it can follow the automatic coal mining machine as it moves away from the gallery.

Buchanan Patent 2,222,019, dated November 19, 1940, discloses a conveyor mechanism which obviates the difficulty above mentioned by providing guide means which cause a single conveyor belt to turn a corner, so to speak. With the arrangement shown by Buchanan the slack or storage loop of belting can be maintained in the gallery where sufficient room is available. However, the apparatus shown by Buchanan has never been found commercially acceptable, to the best of my knowledge. The principal reason is that Buchanan's mechanism for changing the direction of travel of the belt would quite obviously be difficult to maintain in operating condition. The chief element of his direction-changing apparatus is a guide device positioned diagonally to the paths of travel of the two sections of his belt, around which the belt passes spirally. Buchanan's guide device does not rotate but is provided with a number of small rollers, caster mounted, which align themselves with their axes normal to the direction of travel of the belt surface as it passes over them. These rollers must, of course, be of relatively small diameter and, therefore, their speed of rotation must be high. Bearing maintenance of high speed rollers is always costly.

Another defect of Buchanan's apparatus is that the material from the first section of his belt discharges onto the second section over his diagonal guide means and tends to spill over or fall off the receiving belt on the side opposite that from which it enters. It is necessary to use cumbersome guide plates to minimize this spillage.

It is an object of my invention, therefore, to provide a novel means for changing the direction of travel of a moving belt. It is another object to provide a combination of such means with a conveyor belt. It is another object to provide a conveyor belt apparatus which is capable of conveying bulk material around a corner without substantial spilling. It is another object of my invention to provide such a conveyor mechanism of compact construction so that it can be used in galleries and passages with little head room. Other objects of my invention will appear in the course of my description to follow.

My invention will be most readily understood by reference to a present preferred embodiment thereof illustrated in the attached figures.

FIG. 2 is a perspective view of the rolls shown diagrammatically in FIG. 1 in their mounting stand but without the conveyor belt.

FIG. 3 is a plan or elevation partly in longitudinal section of a portion of a novel guide roll of my invention.

Figure 4:
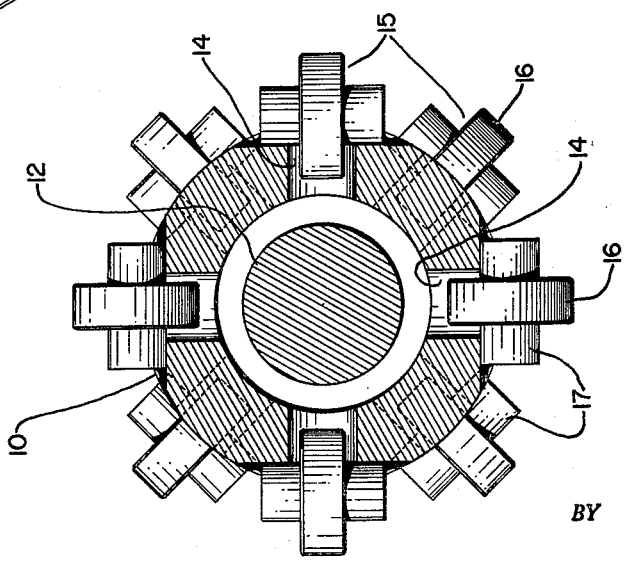
FIG. 4 is a cross section taken on the plane 4—4 of the roll of FIG. 3.

I have found that a flat belt, such as a conveyor belt, can be caused to move spirally about a roll member so as to change its direction if the roll member is freely rotatable about its axis and is provided with a belt-engaging surface made up of smaller rollers set into the roll surface so that each of them is freely rotatable about its own axis in a plane which includes the axis of the roll. Rolls 4 and 6 in FIG. 2 are such rolls and are shown in more detail in FIGS. 3 and 4. Such a roll may be formed with a cylindrical hollow body shell 10 provided at each end with an internal antifriction bearing 11 in which is journaled a shaft 12 which extends through the roll. The cylindrical shell 10 of the roll is formed with a plurality of holes or cutout portions 14 which are elongated in the direction of the roll axis. In each of these apertures 14 is positioned a freely rotatable roller 15. Each roller 15 is cylindrical in shape with a substantially flat cylindrical outer surface 16. Each roller 15 is journaled for free rotation on a shaft 17 which is attached to shell 10. Shaft 17 may be journaled in an antifriction bearing carried within roller shell 16, if desired. Rolls 4 and 6, above described, are idler rolls, that is to say, each of them is caused to rotate about its shaft 12 by the movement of the belt over its surface, to be described.

FIG. 2, as has been mentioned, illustrates the mounting of the six rolls required for a preferred embodiment of my invention. In addition to rolls 4 and 6, previously described, I employ four additional rolls numbered 1, 2, 3 and 5, each of which is a conventional smooth surfaced cylindrical idler roll which rotates freely about its axial shaft 12 in the same manner as rolls 4 and 6 rotate about their axial shafts. An upright structure 20 is provided with two vertical faces 21 and 22 which join at an angle of 45 degrees. A somewhat similar upright structure 23 is provided with two vertical faces 24 and 25 which likewise join at an angle of 45 degrees. Shaft 12 of roll 6 is fastened at one end in vertical face 22 of upright 20 and at the other end in vertical face 24 of upright 23. Roll 4 is likewise supported by structures 20 and 23 in a position directly above roll 6 so that its axis is parallel to that of roll 6. A third upright structure 27 is provided with vertical faces 28 and 29 which join each other at a 90 degree angle. Rolls 3 and 5 are supported in faces 21 and 28 of uprights 20 and 27 so that the two rolls are parallel to each other and roll 3 is directly above roll 5. Rolls 1 and 2 are supported at their ends by faces 29 and 25 of uprights 27 and 23 in the same manner as has been described for the other rolls previously mentioned. Rolls 1 and 2 are positioned so that their axes are parallel to each other. Roll 1 is positioned above roll 2 and somewhat nearer to roll 3 than is roll 2. It will be understood that since all rolls are to support a conveyor belt, they are all positioned so that the flights of the belt will be maintained horizontal crossways of its path.

Figure 1:
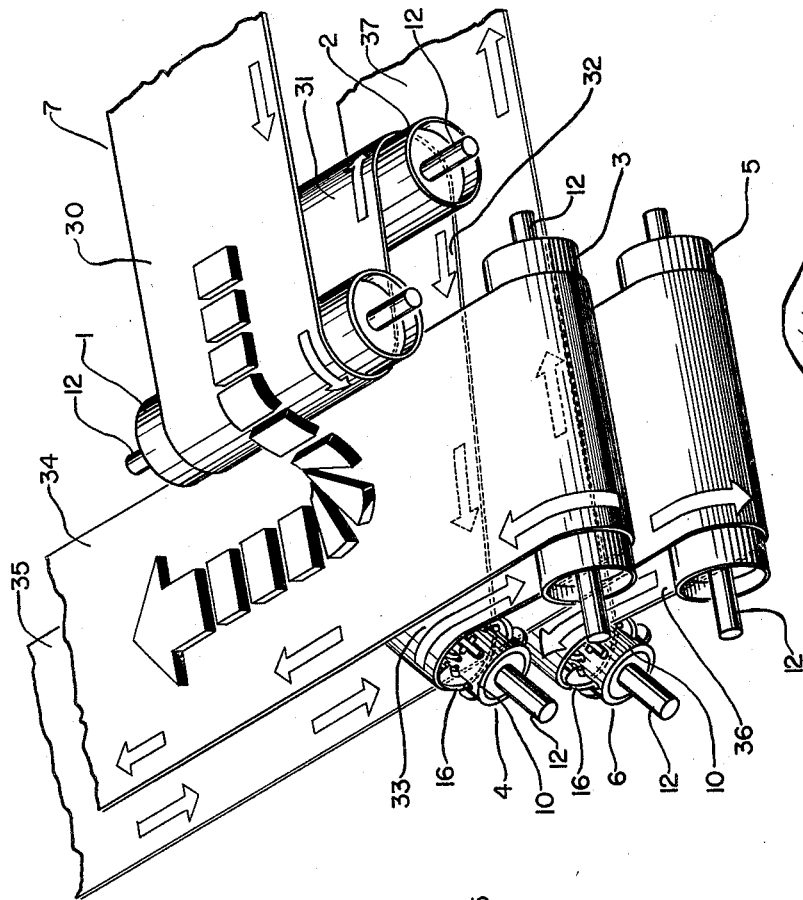
FIG. 1 is a diagrammatic view in perspective of the elements of my conveyor mechanism which bring about change in direction of the belt.

FIG. 1 shows a conveyor belt together with the six rolls previously mentioned in the same relation as they are in FIG. 2, but is drawn from a different viewpoint. In FIG. 1 the conveyor belt, indicated generally as 7, is shown looped around the six rolls previously described and is also supplied with arrows showing the direction of movement of the belt in its course around the rolls. The upper flight of belt 7 is shown as coming in from the upper right hand corner of FIG. 1 toward roll 1. The upper flight of the belt at this point is designated 30. Upper flight 30 passes over and under roll 1 through an arc of 180 degrees and becomes flight 31 moving in a direction opposite to that of flight 30. Flight 31 passes over and under roll 2 where it becomes flight 32 travelling in the same direction as flight 30 but in a plane below that of flight 30. Flight 32 passes under and spirally over roll 4 where it becomes flight 33 moving in a direction at right angles to that of flight 32. Flight 33 passes under and over roll 3 and becomes flight 34 moving in a direction opposite to that of flight 33 but in a plane above that of flight 33. Because of the relative positions of rolls 1 and 3, flight 34 passes under flight 30 where it is wrapped around roll 1 so that material carried by flight 30 is deposited upon flight 34, as is shown by the segmented arrow in the figure.

Flight 34 passes out of the figure toward the upper left hand corner and is considered to pass over a roll not shown, which may be a driven roll, and through a slack or storage device, also not shown, before it returns to the figure as lower flight 35 in a plane parallel to that of flight 34 but positioned below it. Flight 35 passes over and under roll 5, where it becomes flight 36 which passes over and spirally under roll 6 and emerges as flight 37 moving parallel to incoming flight 30 but in the opposite direction. Flight 37, of course, passes over a roll, not shown, carried by or positioned adjacent to the automatic mining machine, to return to the figure as flight 30.

It will be observed that material coming in on flight 30 moves along a straight path and, after it is deposited upon flight 34, moves along another straight path at an angle to that of flight 30. In plan these paths of travel intersect, but in elevation the path of flight 30 must be above that of flight 34 so that material from it can be deposited upon flight 34 by gravity. It will also be noted that the axes of rolls 1, 3 and 4 form in plan an isosceles triangle. If rolls 1 and 3 are at right angles, as they are shown in FIG. 1, the triangle is a right triangle. One end of the path of travel provided by flight 30 is determined by roll 1. One end of the path of travel provided by flight 34 is determined by roll 3.

Belt 7 moves over rolls 1, 2, 3 and 5 in a direction at right angles to the roll axes which is, of course, the conventional mode of travel of a belt over a roll. No further description of this movement is therefore required.

The movement of belt 7 over rolls 4 and 6, however, is novel. Since belt 7 moves spirally about roll 4, that is, in a direction which is not at right angles to the axis of the roll, and the same way about roll 6, each point on the belt moves with respect to the roll in a direction which can be split into a component perpendicular to the roll axis and a component parallel to the roll axis. The component of belt motion perpendicular to the roll axis causes the roll to rotate about its own axis just as would a conventional idler roll. The component of motion parallel to the roll axis causes the individual rollers 15, which are in contact with the belt surface, to rotate about their own axes, which are all perpendicular to the roll axis. Since roll 4, and likewise roll 6, rotates about its own axis, successive areas of the belt are brought into contact with different rollers 15 and, therefore, the speed of rotation of rollers 15, even though these rollers are small, is far less than the rotational speed of the belt guide rollers in prior art apparatus, such as that of the Buchanan patent previously mentioned. Furthermore, each roller 15 is in contact with the belt 7 only through about 180 degrees of rotation of roll 4 or 6, and is out of contact during the next 180 degrees of rotation so that the effective rotational speed of each roller 15 is only half its rotational speed while it is in contact with belt 7.

It will be seen from an inspection of FIG. 2 that although my apparatus requires six rolls, the arrangement is compact in a vertical direction and does not require excessive head room. In the vertical direction, roll 5 is intermediate rolls 4 and 6, roll 2 is at the same level as roll 4, and roll 1 is elevated above roll 3 only sufficient to allow the belt passing around the underside of roll 1 to clear the belt passing over roll 3.

The arrangement of my apparatus also facilitates removal of the belt if this becomes necessary. With the belt in place the various rolls may be removed from the uprights supporting them and the belt will then, of course, collapse in a series of folds. If flights 30 and 37, shown in my FIG. 1, are then moved in a clockwise direction with respect to that figure, the belt will lie in a straight line and the folds can be pulled out without forming any loops which would require cutting of the belt to eliminate.

It will be evident from the foregoing description and attached figures that bulk material carried by flight 30 of my apparatus is deposited on flight 34 of my belt 7 without any tendency to spill off. The position of roll 1 with respect to roll 3 can always be adjusted so that material is deposited far enough from the outside edge of flight 34 that it will not be carried over. No guide plates or similar devices are required.

The idler rolls 4 and 6 of my invention are shown as provided with rollers 15 arranged with equal spaces between them in rows parallel to the roll axis. These rows are disposed at equal circumferential intervals around the surface of the roll and adjoining rows of rollers are offset longitudinally with respect to each other so that each roller in each row adjoins a space between rollers in a row in each side of it. Other arrangements of rollers about the surface of the roll are satisfactory as long as they provide uniform support for the belt as it passes spirally around the idler roll and as long as each roller rotates freely about its own axis in a plane containing the idler roll axis. The individual rollers I employ are cylindrical with flat outer surfaces. The dimension axially of the roller is considerably less than its diameter so that drag of the belt across the roller is minimized. The diameter of the individual rollers is, of course, small compared to that of the idler roll itself.

I claim:

1. In a belt conveyor system for moving material continuously along two straight paths of travel intersecting in plan, the combination comprising an endless belt, first and second rolls arranged transversely to the first path of travel so that the first roll defines an end of that path and the second roll is positioned below the first roll, a third roll arranged adjacent the first and second rolls and transversely to the second path of travel so that the third roll defines an end of that path, and a fourth roll arranged diagonally in plan with respect to the first and third rolls; the belt being looped to travel over and under the first roll, over and under the second roll in the direction opposite to that of its travel around the first roll, under and spirally over the fourth roll, whereby its path of travel is changed, and under and over the third roll.

2. The combination of claim 1 in which the fourth roll is an idler roll having a belt-engaging surface comprising a plurality of freely rotatable rollers supported by the roll, each with its axis transverse to that of the idler roll and perpendicular to a diameter thereof.

3. The combination of claim 1 in which the third roll is positioned below the first roll and the fourth roll is positioned below the third roll.

4. The combination of claim 1 in which the axes of the first, third and fourth rolls form in plan an isosceles triangle.

5. A belt conveyor system for moving material continuously along two straight intersecting paths of travel, comprising an endless belt having a load-carrying flight and a return flight, first and second rolls arranged transversely to the first path of travel so that the first roll defines an end of that path and the second roll is positioned below the first roll, third and fifth rolls arranged adjacent the first and second rolls and transverse to the second path of travel so that the third roll defines an end of that path and the fifth roll is positioned below the third roll, and fourth and sixth rolls arranged parallel to each other and diagonally in plan with respect to the first and third rolls, the sixth roll being positioned below the fourth roll; the load-carrying flight being looped over around the first roll, over around the second roll in the direction opposite to that of the loop around the first roll, under and spirally around the fourth roll, and under and around the third roll, and the return flight being looped over and around the fifth roll and over and spirally around the sixth roll.

6. A belt conveyor system as in claim 5 in which the fourth and sixth rolls are idler rolls having a belt-engaging surface comprising a plurality of freely rotatable rollers supported by the roll, each with its axis transverse to that of the idler roll and perpendicular to a diameter thereof.

7. A belt conveyor system as in claim 5 in which the third roll is positioned below the first roll and the fourth roll is positioned below the third roll.

8. In a belt system the combination of a first idler roll, a second idler roll adjacent thereto having a belt engaging surface comprising a plurality of freely rotating cylindrical rollers supported by the roll, each roller rotating about its own axis in a plane containing the second idler roll axis, the axes of the first and second idler rolls being inclined to each other in plan, and a belt looped around the first and second idler rolls so as to travel around the first idler roll at right angles thereto and from thence spirally around the second idler roll.

9. The combination of claim 8 in which the rollers are greater in diameter than in axial dimension.

10. The combination of claim 8 in which the rollers are disposed in a plurality of axially extending rows spaced uniformly from each other circumferentially of the roll a distance greater than the axial dimensions of a roller.

11. In a belt conveyor system for moving material continuously along two straight paths of travel intersecting in plan, the combination comprising an endless belt, first and second rolls arranged transversely to the first path of travel so that the first roll defines an end of that path and the second roll is positioned below the first roll, a third roll arranged adjacent the first and second rolls and transversely to the second path of travel so that the third roll defines an end of that path, and a fourth roll arranged diagonally in plan with respect to the first and third rolls; the belt being looped to travel over and under the first roll, over and under the second roll in the direction opposite to that of its travel around the first roll, and spirally over the fourth roll, whereby its path of travel is changed, and under and over the third roll.

References Cited in the file of this patent
UNITED STATES PATENTS

| 2,369,479 | Michna | Feb. 13, 1945 |
| 2,798,590 | Raskin | July 9, 1957 |
| 2,873,021 | McWhorter | Feb. 10, 1959 |

FOREIGN PATENTS

| 641,399 | France | Apr. 16, 1928 |
| 528,450 | Germany | June 29, 1931 |